Inventor
PAUL C. B. ALLEN
By Rule & Hoge.
Attorneys

April 17, 1956 — P. C. B. ALLEN — 2,742,275
REGENERATOR FURNACES
Filed Jan. 3, 1952 — 4 Sheets-Sheet 3

Inventor
PAUL C. B. ALLEN
By Rule & Hoge,
Attorneys

April 17, 1956
P. C. B. ALLEN
2,742,275
REGENERATOR FURNACES
Filed Jan. 3, 1952
4 Sheets-Sheet 4
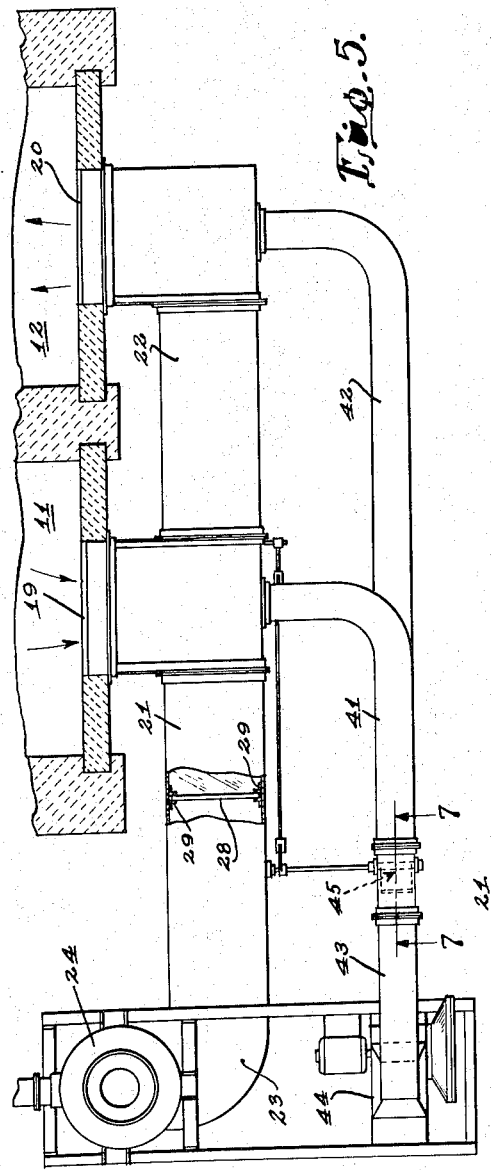
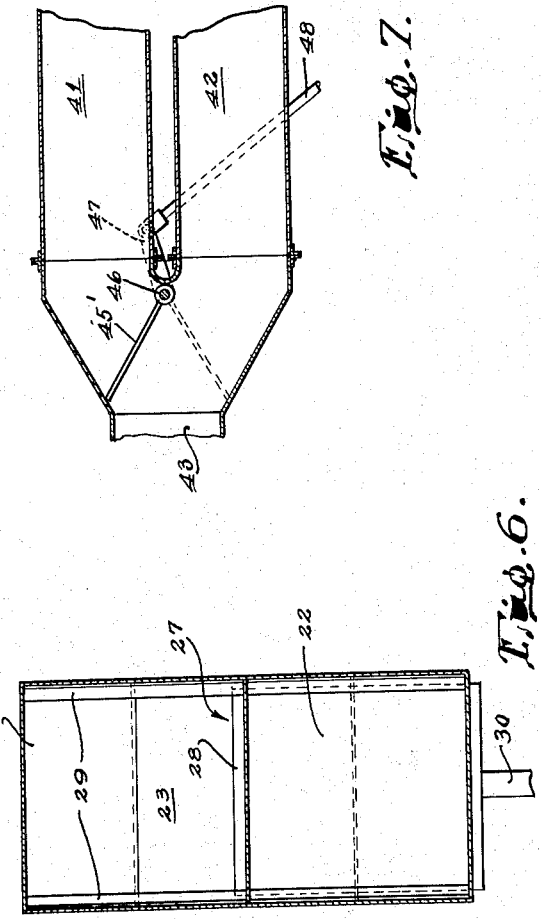
Inventor
PAUL C. B. ALLEN
By Rule and Hoge
Attorneys

UNITED STATES PATENT OFFICE 2,742,275
Patented Apr. 17, 1956

2,742,275

REGENERATOR FURNACES

Paul C. B. Allen, Toledo, Ohio, assignor to Owens-Illinois Glass Company, a corporation of Ohio Application January 3, 1952, Serial No. 264,776

3 Claims. (Cl. 263—15)

This invention relates to regenerator furnaces and more particularly to a novel arrangement and operation of furnace, regenerators, and mechanism for circulating air and gases therethrough.

An object of this invention is to provide a novel arrangement of furnace and regenerators having simplified construction and increased efficiency.

Another object of the invention is to provide a novel apparatus for supplying air to the furnace and removing the exhaust gases therethrough.

Other objects of the invention will appear hereinafter.

Referring to the accompanying drawings:

Fig. 5 is a part sectional plan view of the apparatus for supplying air to and removing exhaust gases from the regenerators;

Fig. 6 is a sectional view of the exhaust valve at the line 6—6 on Fig. 1; and

Fig. 7 is a sectional view of the air control valve at the line 7—7 on Fig. 5.

Figure 1:
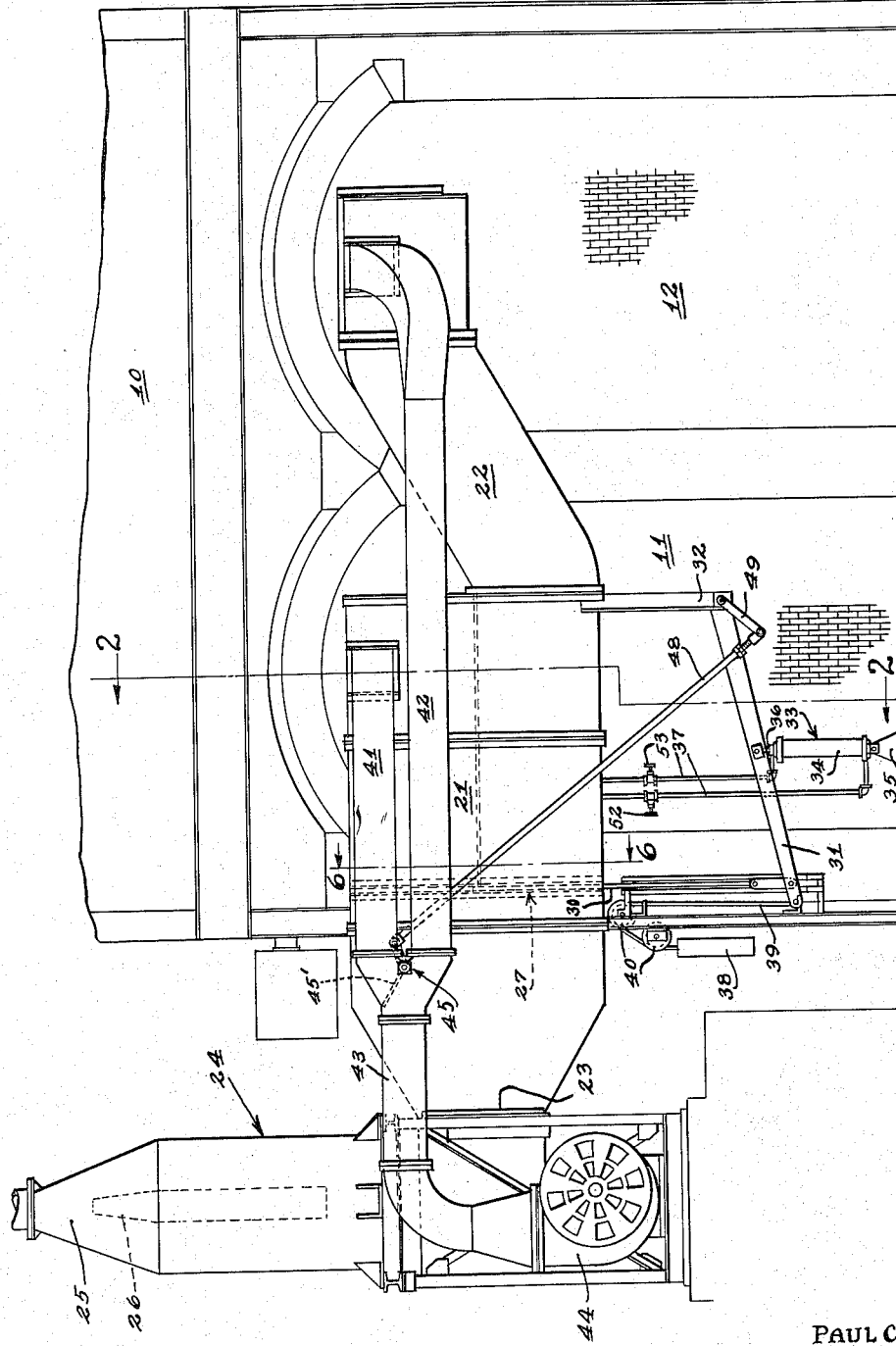
Fig. 1 is an elevational end view of the regenerators showing the air supplying and exhaust gas removing apparatus.
Figure 2:
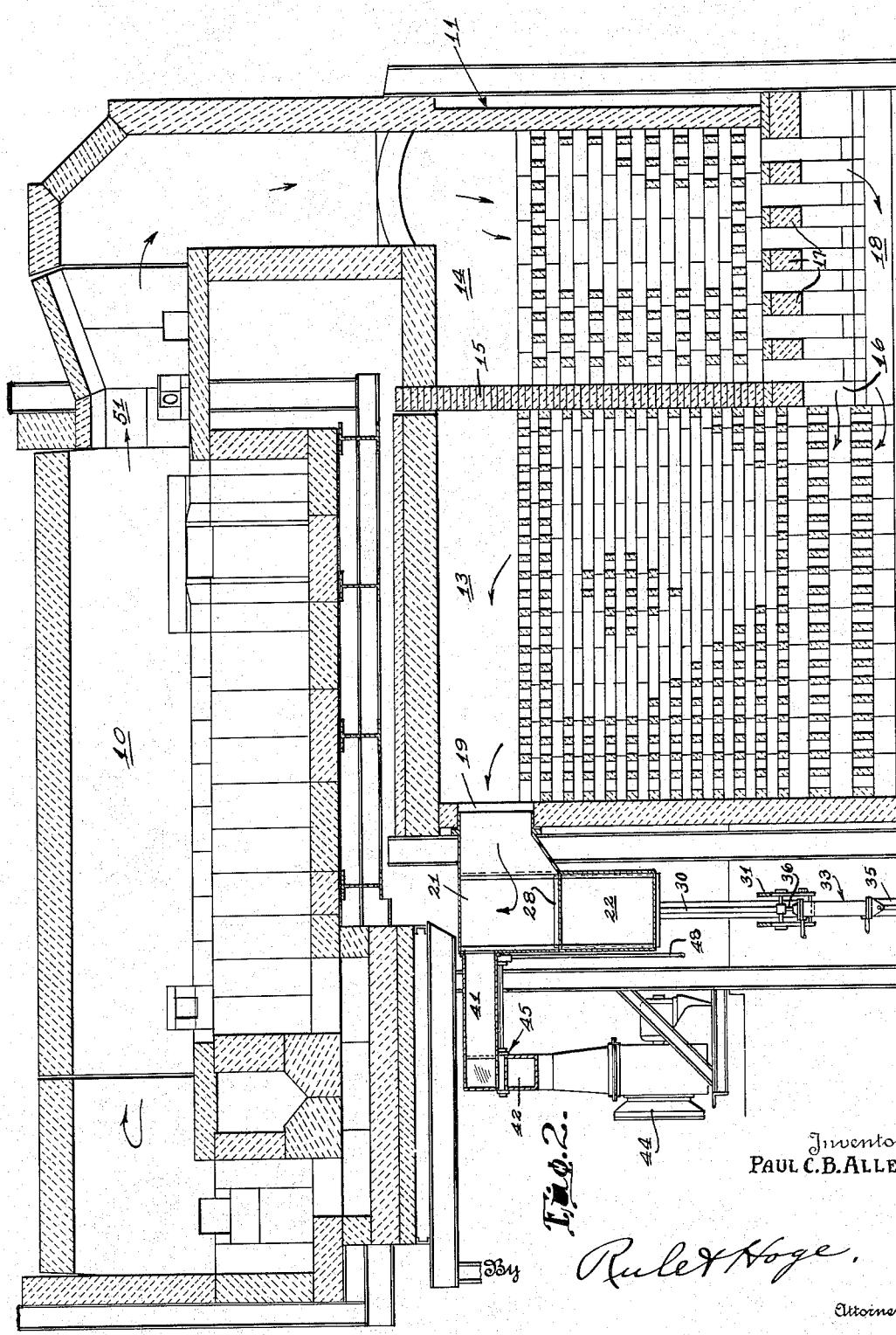
Fig. 2 is a sectional elevational view of the furnace and regenerators at the line 2—2 on Fig. 1.

Referring to Figs. 1 and 2, the arrangement basically includes a furnace 10 connected to regenerators 11 and 12. The operation and interaction of the furnace and regenerators is in accordance with standard procedure. Air for combustion first passes through a regenerator, being thereby heated before entering the furnace. Exhaust gases of combustion from the furnace pass through the second regenerator, giving up heat thereto before being exhausted. Periodically the flow of air and gases is reversed.

Figure 3:
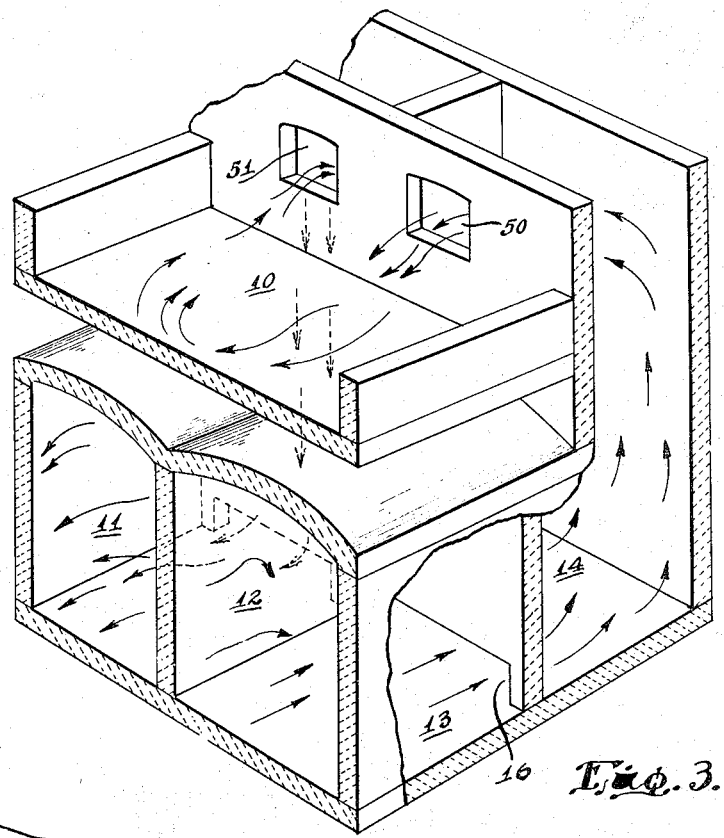
Fig. 3 is a diagrammatic isometric view showing the flow of air and exahust gases between the furnace and regenerators.

The flow of air and gases may be understood more clearly by reference to Fig. 3. Air having passed through the regenerator 11 and absorbed heat therefrom passes upwardly from the regenerator to an opening in the furnace 10 where it is mixed with the fuel and the mixture is burned. The hot exhaust gases of combustion pass from a second opening in the furnace downwardly through the regenerator 12, giving up heat to the regenerator 12, and then are exhausted. Periodically the flow is reversed, as hereinafter described, the flow being from the regenerator 12 to the furnace, then to the regenerator 11.

As shown in Fig. 2, each regenerator is divided into two cells or compartments, 13, 14, respectively, separated by a vertical wall 15. The vertical wall 15 extends from the roof of the regenerator to a point above the floor of the regenerator, leaving an opening 16 permitting flow of air or gases between the cells. Checkerwork is provided in each cell. The checkerwork in the cell 14 is supported on arches 17 leaving an open space 18 below the checkerwork adjacent to the opening 16.

Air and gases are supplied to or removed from the regenerators 11, 12 through openings 19, 20 respectively, in the end walls of the regenerators (Fig. 5).

Referring to Figs. 1 and 5, the means for removing the exhaust gases of combustion from each regenerator includes ducts 21, 22 from the openings 19, 20, respectively. The ducts 21, 22 merge into a single header 23 which in turn is connected to an air ejector 24. The air ejector 24 is of the usual type and includes a venturi 25 and an air pipe 26. Air from an outside source is forced through the venturi 25 causing the exhaust gases from the header 23 to be removed by upward movement through the venturi. An exhaust gas control valve 27 is provided to alternately open and close the connection between the ducts 21, 22, and the header 23, and thereby alternately exhaust the regenerators.

As shown in Fig. 6, the valve 27 comprises a rectangular gate 28 vertically reciprocable in channels 29. The periodic operation is accomplished by an apparatus shown in Figs. 1 and 2. The rectangular gate 28 is connected to a vertical shaft 30, which at its lower end has a link connection with the free end of a lever arm 31. The other end of the arm 31 is pivoted to a rigid support 32. A piston motor 33 is positioned below the arm 31. The cylinder 34 of the motor 33 is pivotally fastened to a rigid support 35, while the piston shaft 36 of the motor is pivotally fastened to the arm 31 at a point intermediate the ends thereof. Fluid is supplied to the motor 33 through the lines 37 controlled by valves 52, 53. By alternately opening and closing valves 52, 53, fluid is applied to opposite ends of the motor and the shaft 36 of the motor is caused to move upwardly and downwardly, pivoting the arm 31 and in turn changing the position of the gate 28. A counterweight 38, connected to the arm 31 by a cable 39 and passing over pulleys 40, is provided to facilitate movement of the gate. By movement of the gate, the exhaust gases are removed alternately from the regenerators.

Air is supplied to the regenerators through conduits 41, 42 connected to the ducts 21, 22 at a point adjacent the openings 19, 20, respectively. The conduits merge into a single pipe 43 which is connected to a motor driven air blower 44. A gate valve 45 is provided at the juncture of the conduits to direct the flow of air into either one or the other of the conduits.

As shown in Fig. 7, the gate valve includes a gate 45' pivoted at 46 and connected to a lever arm 47. The air gate valve 45 is actuated at the same time as the exhaust valve 27 and by the same operation. The lower arm 47 is connected through a link or rod 48 (Fig. 1) to a short rock arm 49 fixed to the pivot shaft of the arm 31. When the arm 31 is pivoted to actuate the exhaust gas valve 27 the arm 49 is also pivoted and in turn actuates the air gate valve 45 through the linkage.

Figure 4:
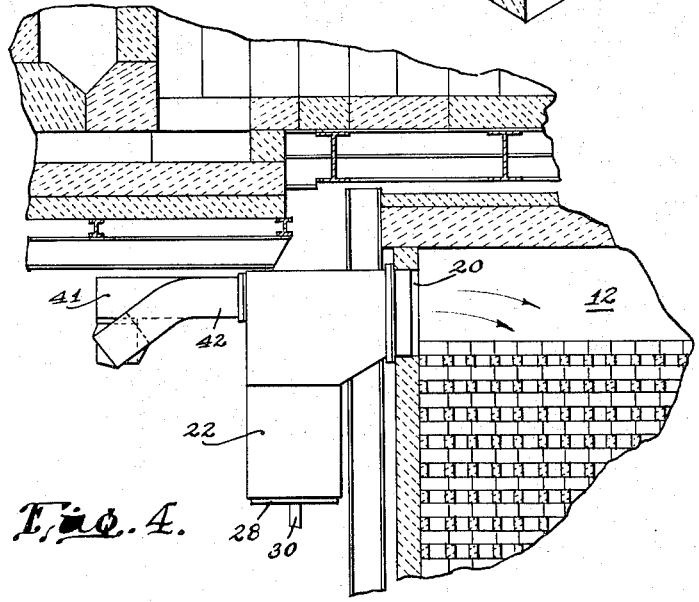
Fig. 4 is a vertical sectional view showing the flow of air into a regenerator.

The operation of the furnace regenerators and circulating apparatus may be summarized as follows:

Referring to Fig. 1, when the exhaust gas valve 27 is in its lowered position as shown, communication is provided between the regenerator 11 through duct 21 to the air ejector 24. At the same time the air valve 45 is in position to provide communication between the air blower 44 through conduit 42 to regenerator 12. Air flows into the regenerator 12 through opening 20 (Fig. 4) downwardly through the checkerwork of cell 13, through opening 16 to space 18 and upwardly through the checkerwork in the cell 14. In passing through the regenerator the air absorbs heat from the checkerwork. From the regenerator, the heated air moves into the furnace through a port 50 (Fig. 3) and mixes with the fuel and the mixture is burned. The exhaust gases of combustion pass from the furnace through a second port 51 (Figs. 3 and 2) to the second regenerator 11. As shown in Fig. 2, the gases pass downwardly through the checkerwork in cell 14, to the space 18, through opening 16, and then upwardly through the checkerwork in cell 13, to the opening 19. The gases are then removed through duct 21 to the air ejector 24.

The space 18 not only provides a connection between cells but also serves as a point at which foreign particles such as ash, soot, and the like in the exhaust gases may settle and be collected for easy removal. In addition, this prevents the deposition of these particles on the checkerwork of cell 13 thereby requiring little or no maintenance and cleaning of the checkerwork.

Periodically, the valves may be reversed causing a flow of air and exhaust gases of combustion in the reverse direction.

Modifications may be restored to within the spirit and scope of the appended claims.

I claim:

1. The combination of a furnace provided with a pair of ports at one end thereof, regenerators individual to said ports and in communication therewith, each said regenerator being provided with an opening through which air and exhaust gases may be directed alternately, a venturi-type ejector, ducts connected respectively to the openings in the regenerators extending generally transversely thereof, said ducts merging together, the merged end of said ducts extending to the ejector, valve means positioned in said ducts for providing communication of the ejector with said ducts alternately and for closing each said duct to communication with the ejector when the other said duct is in communication with the ejector, air supplying means, a conduit individual to each said regenerator and each connected to the duct of the regenerator at a point in alignment with the opening in the regenerator, said conduits merging together, the merged end of the conduits extending to the air supplying means, valve means positioned in the conduits and operable to provide communication of said conduits alternately with said air supplying means and when one said conduit is in communication with the air supplying means to close the other conduit to communication with the air supplying means, and mechanical interconnecting control means between said duct valve means and conduit valve means whereby when the duct of one regenerator is in communication with its respective regenerator the conduit of the other regenerator is in communication with its respective regenerator.

2. The combination set forth in claim 1, said valve means for alternately providing communication of each said duct with the ejector comprising a gate mounted for reciprocating movement between said ducts.

3. The combination set forth in claim 1, said valve means for providing communication of said conduits alternately with the air supplying means comprising a gate mounted for rotary movement at the point where the ends of the conduits merge together.

References Cited in the file of this patent

UNITED STATES PATENTS

| | | |
|---|---|---|
| 1,727,898 | Naismith et al. | Sept. 10, 1929 |
| 1,848,185 | Mawha | Mar. 8, 1932 |
| 1,911,495 | Frank et al. | May 30, 1933 |
| 1,973,143 | Egler | Sept. 11, 1934 |
| 2,016,458 | Schwalbe | Oct. 8, 1935 |
| 2,248,573 | Kneass | July 8, 1941 |
| 2,397,810 | Roof | Apr. 2, 1946 |
| 2,429,880 | Hays | Oct. 28, 1947 |
| 2,518,314 | Hellan | Aug. 8, 1950 |
| 2,574,740 | Hartman | Nov. 13, 1951 |